(12) United States Patent
Cutter et al.

(10) Patent No.: US 7,266,569 B2
(45) Date of Patent: Sep. 4, 2007

(54) METERING ACCESSING OF CONTENT AND THE LIKE IN A CONTENT PROTECTION SYSTEM OR THE LIKE

(75) Inventors: Benjamin Brooks Cutter, Kirkland, WA (US); Brian P. Evans, Redmond, WA (US); Clifford P. Strom, Sammamish, WA (US); Michael Jay Parks, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 496 days.

(21) Appl. No.: 10/830,632

(22) Filed: Apr. 23, 2004

(65) Prior Publication Data

US 2006/0010076 A1 Jan. 12, 2006

(51) Int. Cl.
*G06F 17/00* (2006.01)
*G06F 7/00* (2006.01)
(52) U.S. Cl. ............... 707/104.1; 707/10; 707/200
(58) Field of Classification Search ......... 707/104.1, 707/10; 713/200; 705/7
See application file for complete search history.

(56) References Cited

U.S. PATENT DOCUMENTS

| 5,715,403 | A | 2/1998 | Stefik ................ 395/244 |
| 6,175,825 | B1* | 1/2001 | Fruechtel ............ 705/404 |
| 6,199,068 | B1* | 3/2001 | Carpenter ............ 707/100 |
| 2004/0064351 | A1* | 4/2004 | Mikurak ............. 705/7 |
| 2004/0103305 | A1* | 5/2004 | Ginter et al. ......... 713/200 |
| 2004/0107125 | A1* | 6/2004 | Guheen et al. ........ 705/7 |
| 2004/0205510 | A1* | 10/2004 | Rising, III ......... 715/501.1 |

FOREIGN PATENT DOCUMENTS

| WO | WO 00/58811 | 10/2000 |
| WO | WO 00/59150 | 10/2000 |
| WO | WO 01/52021 A1 | 7/2001 |

OTHER PUBLICATIONS

Housley, R. et al., "Metering: A Pre-Pay Technique", *Proceedings of the SPIE-The International Society for Optical Engineering*, 1997, 3022, 527-531.
Ogata, W. et al., "Provably Secure Metering Scheme", *Advances in Cryptology-ASIACRYPT, 6th International Conference on the Theory and Application of Cryptology and Information Security. Proceedings(Lecture Notes in Computer Science 1976)*, 2000, 388-398.

(Continued)

*Primary Examiner*—John Cottingham
*Assistant Examiner*—Kuen S Lu
(74) *Attorney, Agent, or Firm*—Woodcock Washburn LLP

(57) ABSTRACT

Metered data is accumulated and is indexed within a metering database of a client according to a metering ID (MID) and a content-associated ID (KID). The client selects a particular MID and metered data in the metering database having the selected MID, and constructs a challenge based on the selected metered data and sends same to a metering service. The metering service obtains the metered data from the challenge, stores same, and constructs a response. The client receives the response including a list of KIDs of the selected metered data in the challenge, and processes the list of KIDs by, for each KID in the list, deleting the metered data from the metering database having the selected MID and the KID.

16 Claims, 4 Drawing Sheets

OTHER PUBLICATIONS

Seok Kim, S. et al., "A Secure and Efficient Metering Scheme for Internet Advertising", *Journal of KISS: Computer Systems and Theory*, 2002, 29(3-4), 153-160.

Hong, S. et al., "On the construction of a powerful distributed authentication server without additional key management", *Computer Communications*, 2000, 23, 1638-1644.

Managing Digital Rights in Online Publishing, "How two publishing houses maintin control of copyright" *Information Management & Technology*, 2001, 34(4), 168-169.

Jakobsson, M. et al., "Proprietary Certificates", *Topics in Cryptology*, 2002, 164-181.

Kumik, P. "Digital Rights Management", *Computers and Law*, 2000, 11(4), 14-15.

Torrubia, A. et al., "Cryptography regulations for E-commerce and digital rights management", *Computers & Security*, 2001, 20(8), 724-738.

Zwollo, K. "Digital document delivery and digital rights management", *Information Services & Use*, 2001, 9-11.

Griswold, G.N. "A Method for Protecting Copyright on Networks", *IMA Intellectual Property Project Proceedings*, 1994, 1(1), 169-178.

Kahn, R.E. "Deposit, Registration and Recordation in an Electronic Copyright Management System", *IMA Intellectual Property Project Proceedings*, 1994, 1(1), 111-120.

Evans, P. "DRM: Is the Road to Adoption Fraught with Potholes?" *Seybold Reporting Analyzing Publishing Technologies*, 2001, 1(14), 32.

Fowler, T.B. "Technology's Changing Role in Intellectual Property Rights", *IT Professional(IEEE)*, 2002, 4(2), 39-44.

Gable, J. "The Digital Rights Conundrum", *Transform Magazine*, 2001, 10(11), 27.

Gunter, C.A., et al. "Models and Languages for Digital Rights", *Proceedings of the 34th Annual Hawaii International Conference on System Sciences*, 2001, 1-5.

Peinado, M. "Digital rights management in a multimedia environment", *SMPTE Journal*, 2002, 111(3), 159-163.

Royan, B. Content creation and rights management; experiences of SCRAN(the Scottish Cultural Resources Access Network), *Program*, 2000, 34(2), 131-142.

Valimaki, M. et al., "Digital rights management on open and semi-open networks", *WIAPP*, 2001, 154-155.

Yu, H. "Digital multimedia at home and content rights management", *IEEE, Proceedigns 2002 IEEE 4th International Workshop on Networked Appliances*, 2002, 49-56.

Hwang, C. et al., "Protection of Digital Contents on Distributed Multimedia Environment", *Proceedings of the LASTED International Conference, Internet and Multimedia Systems and Applications*, Nov. 19-23, 2000, Las Vegas, Nevada, USA, pp. 127-132.

\* cited by examiner

METERING ACCESSING OF CONTENT AND THE LIKE IN A CONTENT PROTECTION SYSTEM OR THE LIKE

TECHNICAL FIELD

The present invention relates to an architecture and method for allowing metering of accessing of digital content and the like, especially within the context of a content protection system. More particularly, the present invention relates to such an architecture and method whereby data representative of the metered accessing of the content is collected and reported out to a metering service.

BACKGROUND OF THE INVENTION

As is known, and referring now to FIG. 1, a content protection and enforcement system is highly desirable in connection with digital content 12 such as digital audio, digital video, digital text, digital data, digital multimedia, etc., where such digital content 12 is to be distributed to users. Upon being received by the user, such user renders or 'plays' the digital content with the aid of an appropriate rendering device such as a media player on a personal computer 14, a portable playback device or the like.

Typically, a content owner distributing such digital content 12 wishes to restrict what the user can do with such distributed digital content 12. For example, the content owner may wish to restrict the user from copying and re-distributing such content 12 to a second user, or may wish to allow distributed digital content 12 to be played only a limited number of times, only for a certain total time, only on a certain type of machine, only on a certain type of media player, only by a certain type of user, etc.

However, after distribution has occurred, such content owner has very little if any control over the digital content 12. A copy protection system 10, then, allows the controlled rendering or playing of arbitrary forms of digital content 12, where such control is flexible and definable by the content owner of such digital content. Typically, content 12 is distributed to the user in the form of a package 13 by way of any appropriate distribution channel. The digital content package 13 as distributed may include the digital content 12 encrypted with a symmetric encryption/decryption key (KD), (i.e., (KD(CONTENT))), as well as other information identifying the content, how to acquire a license for such content, etc.

The trust-based copy protection system 10 allows an owner of digital content 12 to specify rules that must be satisfied before such digital content 12 is allowed to be rendered. Such rules can include the aforementioned requirements and/or others, and may be embodied within a digital license 16 that the user/user's computing device 14 (hereinafter, such terms are interchangeable unless circumstances require otherwise) must obtain from the content owner or an agent thereof, or such rules may already be attached to the content 12. Such license 16 and/or rules may for example include the decryption key (KD) for decrypting the digital content 12, perhaps encrypted according to another key decryptable by the user's computing device or other playback device.

The content owner for a piece of digital content 12 would prefer to distribute the content 12 to the user unless such owner can trust that the user will abide by the rules specified by such content owner in the license 16 or elsewhere. Preferably, then, the user's computing device 14 or other playback device is provided with a trusted component or mechanism 18 that will not render the digital content 12 except according to such rules.

The trusted component 18 typically has an evaluator 20 that reviews the rules, and determines based on the reviewed rules whether the requesting user has the right to render the requested digital content 12 in the manner sought, among other things. As should be understood, the evaluator 20 is trusted in the copy protection system 10 to carry out the wishes of the owner of the digital content 12 according to the rules, and the user should be able to easily alter such trusted component 18 and/or the evaluator 20 for any purpose, nefarious or otherwise.

As should be understood, the rules for rendering the content 12 can specify whether the user has rights to so render based on any of several factors, including who the user is, where the user is located, what type of computing device 14 or other playback device the user is using, what rendering application is calling the copy protection system 10, the date, the time, etc. In addition, the rules may limit rendering to a pre-determined number of plays, or pre-determined play time, for example.

The rules may be specified according to any appropriate language and syntax. For example, the language may simply specify attributes and values that must be satisfied (DATE must be later than X, e.g.), or may require the performance of functions according to a specified script (IF DATE greater than X, THEN DO . . . , e.g.).

Upon the evaluator 20 determining that rules are satisfied, the digital content 12 can then be rendered. In particular, to render the content 12, the decryption key (KD) is obtained from a pre-defined source such as the aforementioned license 16 and is applied to (KD(CONTENT)) from the content package 13 to result in the actual content 12, and the actual content 12 is then in fact rendered.

Note that the trusted component 18 may at times be required to maintain state information relevant to the rendering of a particular piece of content 12 and/or the use of a particular license 16. For example, it may be the case that a particular license 16 has a play count requirement, and accordingly the trusted component 18 must remember how many times the license 16 has been employed to render corresponding content 12 or how many more times the license 16 may be employed to render the corresponding content 12. Accordingly, the trusted component 18 may also include at least one persistent secure store 22 within which such state information is persistently maintained in a secure manner. Thus, the trusted component 18 stores such state information in such secure store 22 in a persistent manner so that such state information is maintained even across sessions of use on the computing device 14. Such secure store 22 is likely located on the computing device 14 of the trusted component 18, although such secure store 22 may alternately be located elsewhere.

In a copy protection system 10, content 12 is packaged for use by a user by encrypting such content 12 and associating a set of rules with the content 12, whereby the content 12 can be rendered only in accordance with the rules. Because the content 12 can only be rendered in accordance with the rules, then, the content 12 may be freely distributed. Typically, the content 12 is encrypted according to a symmetric key such as the aforementioned key (KD) to result in (KD(content)), and (KD(content)) therefore is also decrypted according to (KD) to result in the content 12. Such (KD) is in turn included within the license 16 corresponding to the content 12. Oftentimes, such (KD) is encrypted according to a public key such as the public key of the computing device 14 (PU-C) upon which the content 12 is to be rendered, resulting in (PU-C(KD)). Note, though, that other public keys may be employed, such as for example a public key of a user, a public key of a group of which the user is a member, etc.

Note that in addition to restricting what a user can do with distributed digital content 12, a content owner or the like may also wish to meter the use of such content 12 by such user, by such computing device, or the like. For example, the content owner may wish to know how many times the content 12 has been rendered for the reason that the user is charged a fee based thereon, for the reason that the content owner is owed a fee based thereon, or the like. Correspondingly, the content owner may wish to know how many times the content 12 has been copied, presuming such an option is available, how many times the content 12 has been incorporated into another piece of content, again presuming such an option is available, how long the content is rendered, the time of day the content is rendered, etc. In short, the content owner or the like may wish to meter the use of such content in any manner that in fact may be metered or otherwise counted or accumulated. Thus, the trusted component 18 on the computing device 14 may be employed to perform such metering function and store metered data obtained therefrom in the secure store 22.

In general, metering may be referred to as counting or otherwise accumulating an amount in relation to a piece of content 12, where the amount is representative of a quantity that is to be measured according to the wishes of the content owner or the like. As was set forth above, metering may typically be based on the number of times content 12 is accessed, either by being rendered, copied, transferred, or the like, an amount of time the content 12 is rendered, or the like. Of course, other forms of metering exist, and any other such form of metering may be employed in connection with the present invention as set forth below.

As may be appreciated, metering is useful for many reasons including feedback, monetary bases, and the like. For one example, statistics on usage of a piece of content 12 may be important to a content owner as an indication of whether the content 12 is popular, useful, appreciated, enjoyed, and the like. For another example, statistics on usage of a piece of content 12 may be employed to reward an author of a piece of content 12, even when such author is one of many, many authors. For yet another example, statistics on usage of a piece of content 12 may be employed to calculate a monetary value owed to a content owner. In the latter case in particular, it is to be appreciated that content 12 such as a musical composition can be licensed based on a per use basis, a single payment basis, or a combination thereof. Thus, the license fee as generated to the content owner by use of the content 12 can vary radically based on the licensing basis, and in particular based on whether license fee is based on a fixed amount or a per use amount.

Moreover, inasmuch as detailed metering has not as yet been performed, it is entirely likely that providing the ability to perform such detailed metering will create future business models heretofore unavailable. For one example, the cost to present an advertisement (content 12), which is now based primarily on a preset and fixed rate, can now be based on how many renderings of the advertisement/content 12 are achieved as metered by way of the present invention. For another example, a television program (content 12) is now rated based at least in part upon a market share thereof as measured through a rating service, but such rating is merely an estimate based on a fairly small statistical sampling, while with the present invention such rating could be based on a highly detailed metered measurement of viewers/users of such program/content 12.

Note though that while accessing and usage of content 12 by a user on a computing device 14 may be metered in a relatively straightforward manner, no architecture or method exists for (1) defining what is to be metered, (2) defining how data derived from metering is to be stored on a computing device 14, (3) defining a metering service for collecting metered data from each of several computing devices, or (4) defining how the metered data is to be reported out to the metering service.

Accordingly, a need exists for an architecture and method that effectuate metering data and reporting out metered data to a metering service. In particular, a need exists for an architecture and method that defining what is to be metered, define how data derived from metering is to be stored on a computing device 14, define a metering service for collecting metered data from each of several computing devices, and define how the metered data is to be reported out to the metering service.

SUMMARY OF THE INVENTION

The aforementioned needs are satisfied at least in part by the present invention in which a method is provided to report out accumulated metered data from a client to a metering service. Each piece of metered data is indexed within a metering database of the client according to a metering ID (MID) and is sub-indexed within the metering database according to a content-associated ID (KID).

In the method, the client selects a particular MID and selects at least a portion of the metered data in the metering database having the selected MID, where the selected metered data is organized according to KID. The client then constructs a challenge based on the selected metered data and sends the constructed challenge to the metering service. The metering service obtains the metered data from the challenge, stores same, and constructs a response to be returned to the client based on the challenge.

The client receives the response from the metering service including a list of KIDs of the selected metered data in the challenge, and confirms that the response corresponds to the challenge. Thereafter, the client processes the list of KIDs in the response by, for each KID in the list, deleting the metered data from the metering database having the selected MID and the KID.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
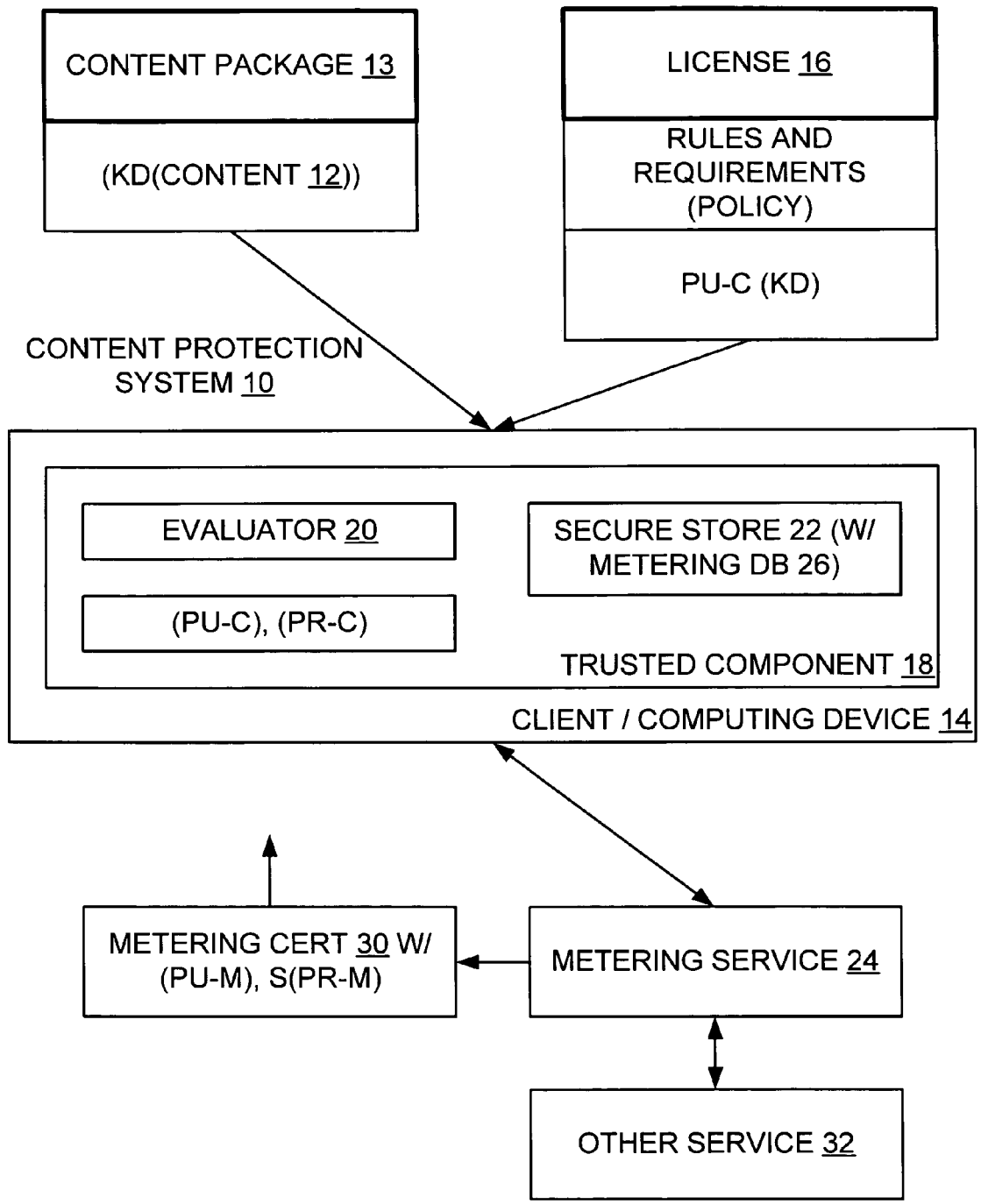
FIG. 1 is a block diagram showing an enforcement architecture of an example of a trust-based system, including a client having a metering database and a metering service receiving metered data therefrom.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, mini-computers, mainframe computers and the like. The invention may also be practiced in distributed computing environments where tasks are performed by remote processing devices that are linked through a communications network. In a distributed computing environment, program modules may be located in both local and remote memory storage devices.

Figure 2:
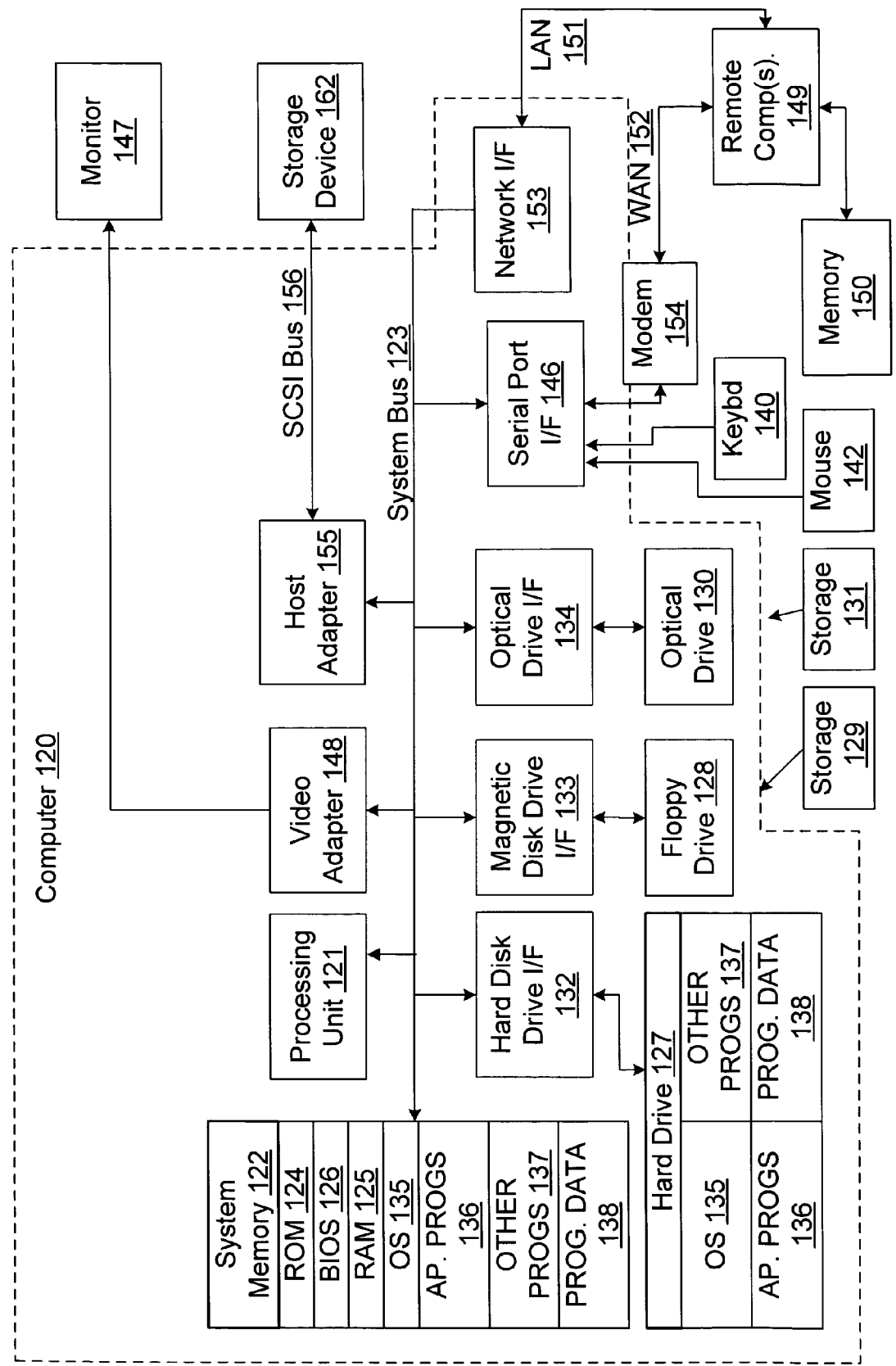
FIG. 2 is a block diagram representing a general purpose computer system in which aspects of the present invention and/or portions thereof may be incorporated.

As shown in FIG. 2, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 2 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 2. The logical connections depicted in FIG. 2 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Metering Accessing of Content 12

In the present invention, accessing of content 12 on a computing device 14 in accordance with a content protection system 10 is metered according to a definition of what is to be metered, and the data derived from the metering is stored on the computing device 14 or elsewhere. Such metered data is periodically reported to a metering service 24 (FIG. 1) that collects metered data from each of several computing devices 14, and in particular is reported out to such metering service 24 according to a set procedure.

Note that content protection denotes a spectrum of methods and technologies for protecting digital content 12 such that such content 12 cannot be used in a manner inconsistent with the wishes of the content owner and/or provider. Methods include copy protection (CP), link protection (LP), conditional access (CA), rights management (RM), and digital rights management (DRM), among other. The basis of any content protection system 10 is that only a trusted application that ensures proper adherence to the implicit and/or explicit rules for use of protected content 12 can access same in an unprotected form. Typically, content 12 is protected by being encrypted in some way, where only trusted parties are able to decrypt same.

Copy protection, in the strictest sense, specifically applies to content 12 residing in a storage device, whereas link protection applies to content 12 flowing between applications/devices over a transmission medium. Conditional access can be thought of as a more sophisticated form of link protection, where premium programs, channels and/or movies are encrypted in transit. Only subscribers who have paid for access to such content 12 are provided with the keys necessary to decrypt same.

Digital Rights Management is an extensible architecture where the rules regarding sanctioned use of a particular piece of content 12 are explicit and bound to or associated with the content 12 itself. DRM mechanisms can support richer and more expressive rules than other methods while providing greater control and flexibility at the level of individual pieces of content or even sub-components of that content. An example of a Digital Rights Management system is set forth in U.S. patent application Ser. No. 09/290, 363, filed Apr. 12, 1999 and U.S. Provisional Application No. 60/126,614, filed Mar. 27, 1999 each of which is hereby incorporated by reference in its entirety.

Rights Management is a form of DRM that is organizationally based in that content 12 can be protected to be accessible only within an organization or a subset thereof. An example of a Rights Management system is set forth in U.S. patent applications Ser. Nos. 10/185,527,10/185,278, and 10/185,511, each filed on Jun. 28, 2002 and hereby incorporated by reference in its entirety.

Defining What is to be Metered

In one embodiment of the present invention, metering on a computing device is performed under the control and auspices of the trusted component 18 on the computing device 14 in the course of employing a license 16 to render corresponding content 12. In such embodiment, the use of/access to/rendering of the content 12 is metered if the license 16 includes a metering tag, such as may be employed in an XML (eXtensible Markup Language)—based license 16, or the like. Thus, it should be appreciated that metering is performed with respect to content 12, even though the decision whether to meter is based on the presence of the metering tag in the license 16.

For example, the following portion of a license 16 includes an MID (Metering ID) tag and the corresponding content 12 is therefore metered by the trusted component 18 in the course of rendering such content 12:

```
<LICENSE version="2.0.0.0">
    ...
    <LICENSORINFO>
        ...
        <DATA>
            ...
            <KID>FgA3Mep5+UiW5yB2CuevGg==</KID>
            <MID>UiW5yBMep2CuevGg5+FgA3==</MID>
```

-continued

```
            ...
        </DATA>
        ...
    </LICENSORINFO>
    ...
</LICENSE>
```

Note that the data associated with the MID tag (hereinafter, 'the MID') may be a base64 encoded 16-byte identification. In one embodiment of the present invention, such MID identifies the recipient of metered data collected in connection with such license 16, as will be set forth in more detail below. Also note that the KID tag identifies the content 12 to which the license 16 is bound, and in at least some instances the data associated with such KID tag (hereinafter, 'the KID') may represent a value from which the content key (KD) for decrypting the content 12 may be derived.

The trusted component 18 may collect any particular type of metered data with regard to use of the content 12 without departing from the spirit and scope of the present invention. In one embodiment of the present invention, the trusted component 18 maintains a count in the secure store 22 for each rendering right (PLAY, COPY, TRANSFER, EDIT, etc.) and increments each such count when the right is employed to access the content 12. Note that the secure store 22 is employed to store the metered data to prevent the user or others from being able to tamper with such metered data. Otherwise, a nefarious user who for example is charged on a per use basis could alter the metered data to reflect a lesser use than might otherwise be truthful.

In an alternate embodiment of the present invention, the MID tag may include therewith data on which rights are to be counted (not shown), and/or data on other aspects of use of the content 12 that are to be measured and how to measure (also shown). Thus, and as was alluded to the trusted component 18 may perform such metering as an amount of time the content 12 is rendered, the number of times rendering is started, the number of times rendering is stopped, the number of keystrokes or mouse movements during rendering, etc., and store appropriate metered data in the secure store 22.

Storing Data Derived from Metering

Figure 3:
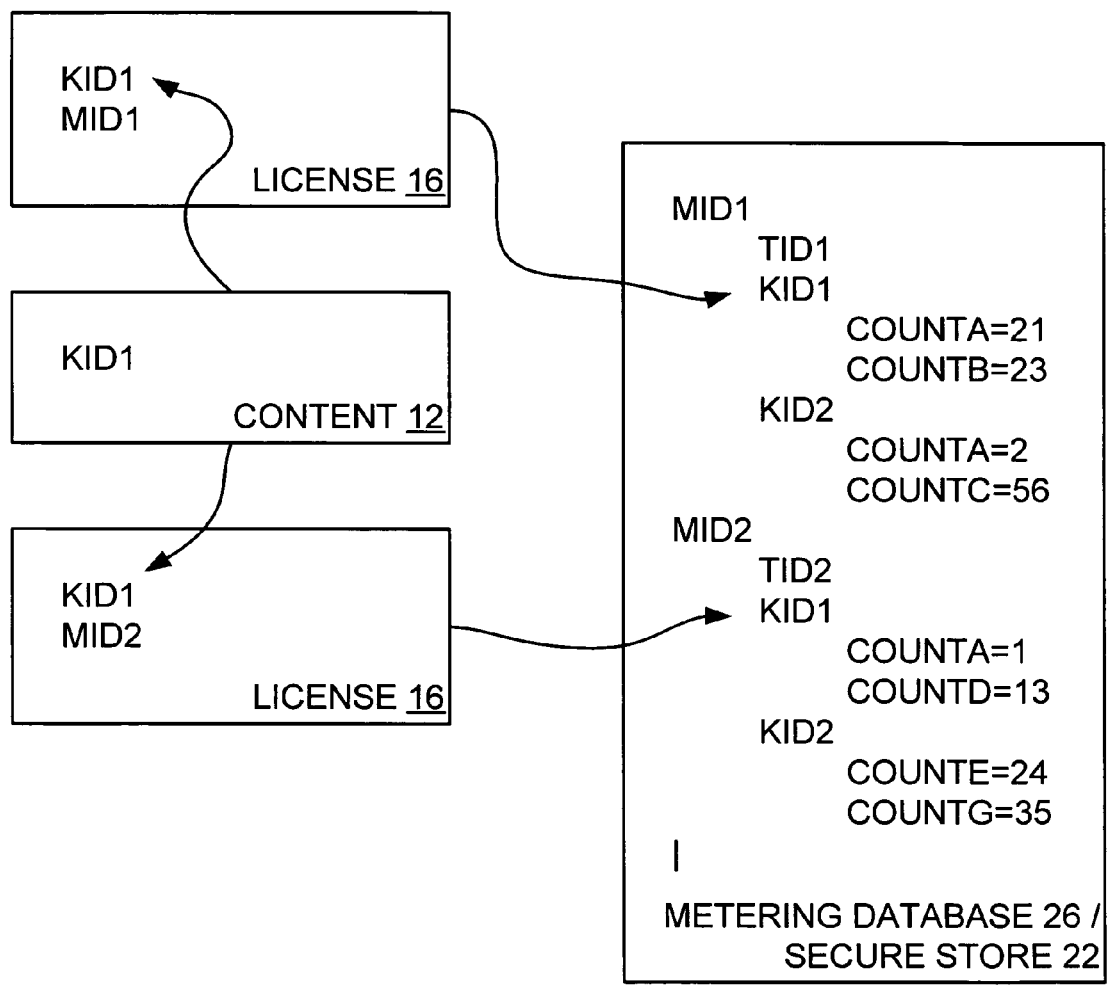
FIG. 3 is a block diagram showing the relationship between digital content, one or more digital licenses tied to the content, and the metered data in the metering database of FIG. 1 in accordance with one embodiment of the present invention.

It is to be appreciated that the trusted component 18 collects metered data with respect to a piece of content 12 in connection with use of a corresponding license 16 to render (i.e., access) such content 12, and appropriately stores such collected meter data in the secure store 22, as is shown in FIG. 3. It is also to be appreciated that in addition, the trusted component 18 may collect license data with respect to the use of the license 16 to render, and may also appropriately store such collected license data in the secure store 22 (not shown).

In one embodiment of the present invention, and as seen in FIG. 3, the trusted component 18 stores metered data in the secure store 22 in a metering database 26 according to the MID in the license 16 that triggered the metering that resulted in the metered data, and also according to the KID of the corresponding metered content 12 as was also set forth in such license 16. In particular, the trusted component 18 stores metered data in the secure store 22 in a metering database 26 according to such MID as a primary index value and such KID is a secondary index value. Thus, for any particular use of a license 16 having a particular MID and KID to render a piece of content 12 having the particular KID, the trusted component 18 updates a corresponding MID, KID index value in the database 26 in the secure store 22 to reflect the use. For example, if such content is PLAYed twice and COPYed once, the trusted component 18 may increment the PLAY count value twice and increment the COPY count value once under the corresponding MID, KID index value in the database 26 in the secure store 22.

Note that multiple licenses 16 may each allow rendering of the same piece of content 12, but may have the same or a different MID therein. Thus, if each of two such licenses 16 has the same MID and is used once to PLAY a piece of content 12, the play count under the MID, KID index value is incremented twice for the two PLAYs. Correspondingly, if each of two such licenses 16 has a different MID (MID1 and MID2) and is used once to PLAY a piece of content 12, the play count under the MID1, KID index value is incremented once for one PLAY and the play count under the MID2, KID index value is likewise incremented once for one PLAY.

Metering Service

As may be appreciated, the metered data as accumulated by the trusted component 18 in the metering database 26 in the secure store 22 is periodically forwarded to a centralized metering service 24, whereby the metering service 24 may receive metered data from a plurality of computing devices and appropriately process same. Such processing may be any appropriate processing without departing from the spirit and scope of the present invention. For example, if an author of a piece of content 12 is to collect a royalty on a per use basis, the metering service may aggregate all counts of use over a period of time with respect to the piece of content 12 and report out same to the author and/or to a royalty-paying entity. Alternately, the metering service may merely receive and store the metered data for retrieval by another service which performs the processing, or may periodically forward the stored metered data to the another service.

Regardless of which service actually processes the metered data, it is to be appreciated that inasmuch as each piece of the metered data is stored in the metering database 26 according to a MID, KID index value thereof, such piece of data may be forwarded to the metering service 24 with such MID, KID index value and also processed according to such MID, KID index value. Accordingly, processing of the forwarded metered data may also be performed according to the MID, KID index value. Thus, and as an example, if a content owner of a piece of content 12 is to collect a flat fee if a total aggregate of all uses of the pieces of content 12 reaches a certain value, such aggregation may be performed based on the KID index value associated with metered data corresponding to such piece of content 12 through and to the metering service 24.

In one embodiment of the present invention, a plurality of metering services 28 may be instantiated to receive forwarded metered data, and each piece of metered data is forwarded to a particular metering service 24 based on the MID associated with such piece of metered data. As may be appreciated, each metering service 24 may be associated with one or more MIDs and thus receive metered data associated with such one or more MIDs.

The association of a MID with a metering service 24 may be established by a content management authority issuing a metering certificate 30 including the MID, an identification of the corresponding metering service 24 such as a URL (Universal Resource Locator), a public key (PU-M) and a signature. Thus, the trusted component 18 on each computing device 14 that is to report metered data having a particular MID associated therewith to a corresponding metering service 24 must have the corresponding metering certificate 30, if only to identify the particular MID with the metering service 24. Typically, the trusted component 18 may be provided with one or more metering certificates 30 when initialized and/or as part of regular updates.

Reporting Metered Data to Metering Service

The computing device 14 (hereinafter, 'client 14') accumulates metered data in the metering database 26 thereof over time and thus may be expected to periodically report such metered data to one or more metering services 28. The periodicity of a reporting period may be any appropriate period without departing from the spirit and scope of the present invention. For example, such periodicity may be daily, weekly, bi-weekly, monthly, etc. Alternately, such periodicity may be based on the metering database 26 reaching a certain size or having a certain amount of metered data therein.

When reporting metered data, a client 14 may report all accumulated metered data in the metering database 26 thereof or may report only a portion of the accumulated metered data in the metering database 26. In particular, in one embodiment of the present invention, the client 14 reports out accumulated metered data in the metering database 26 thereof on a per metering certificate 30 basis. Thus, if the client 14 does not have a metering certificate 30 corresponding to certain metered data in the metering database 26, such certain metered data is reported.

Figure 4:
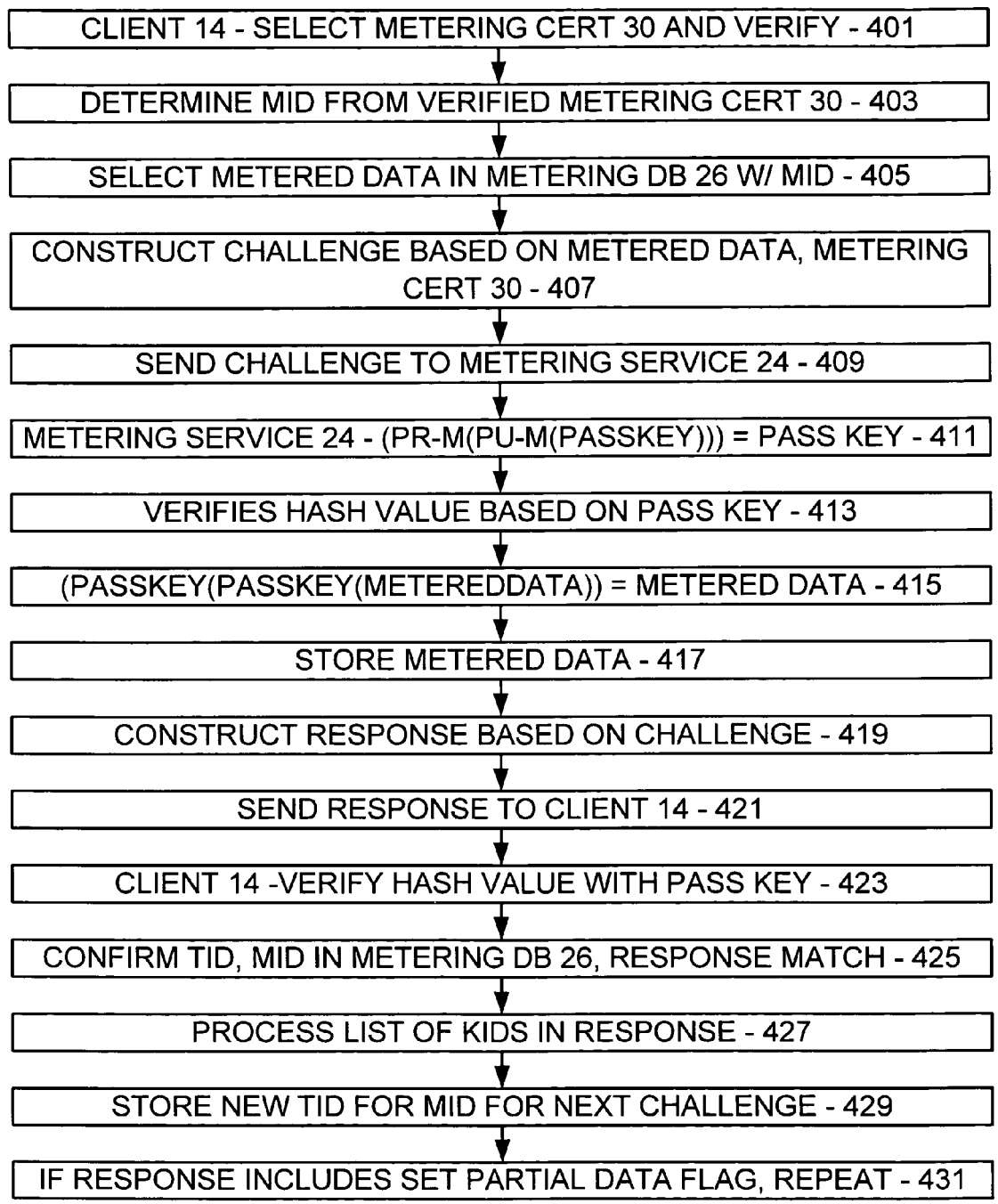
FIG. 4 is a flow diagram showing key steps performed by the client and metering service of FIG. 1 in reporting the metered data from such client to such metering service in accordance with one embodiment of the present invention.

At any rate, and turning now to FIG. 4, in one embodiment of the present invention, the client 14 reports out accumulated metered data in the metering database 26 thereof on a per metering certificate 30 basis in accordance with the following procedure. Preliminarily, the client 14 selects a particular metering certificate 30 and verifies same based on the signature thereof (step 401), and then determines from the verified metering certificate 30 the MID set forth therein (step 403). Thereafter, based on such MID, the client 14 selects and copies into a predetermined format at least a portion of the metered data in the metering database 26 having such MID associated therewith (step 405).

Note that inasmuch as all metered data in the metering database is primarily indexed based on the associated MID thereof, the metered data having a particular associated MID should be located together, at least in a logical sense, and therefore selecting the metered data having a particular associated MID should be a relatively simple task. Note, too, that inasmuch as all metered data in the metering database is secondarily indexed based on the associated KID thereof, the selected metered data should already be organized according to the associated KID. Thus, the selected metered data should be a list of counts or the like organized according to KID, and may for example be placed into an XML format such as the following:

```
<KID0>
    <COUNT1>a</COUNT1>
    <COUNT2>b</COUNT2>
    <COUNT3>c</COUNT3>
</KID0>
<KID1>
    <COUNT4>d</COUNT4>
    <COUNT5>e</COUNT5>
</KID1>
<KID2>
    <COUNT6>f</COUNT6>
</KID2>
```

Note that metered data may already be in the XML format in the metering database 26 of the client 14, in which case such metered data can be copied verbatim into the challenge.

In one embodiment of the present invention, the client 14 with the formatted selected metered data constructs a challenge based on the formatted metered data and the metering certificate 30 (step 407). Such challenge may for example include the MID from the metering certificate 30, the URL or other identification of the corresponding metering service 24 from the metering certificate 30, a transaction ID (TID) selected for the challenge, and the formatted metered data. Note that to protect the formatted metered data from being viewed by other entities, such formatted metered data within the challenge should be encrypted according to a symmetric pass key to result in (passkey(metereddata)), and the pass key should itself be placed in the challenge encrypted according to (PU-M) from the metering certificate 30 to result in (PU-M(passkey)). Such pass key may be any appropriate key without departing from the spirit and scope of the present invention. For example, the pass key may be derived by the client 14 in part from the MID in a one-way reproducible manner.

Note that the TID may be a base64 encoded 16-byte identification, and is generated randomly each time a challenge is successfully sent and responded to and the corresponding metered data is deleted from the metering database 26, as will be set forth in more detail below. As will be set forth in more detail below, the client 14 has already generated the TID of the present challenge for the MID upon successfully completing the previous challenge for the MID, and has stored such generated TID in the metering database 26 according to the MID of the present challenge for retrieval and use in connection with the present challenge for the MID.

Under certain circumstances, the client 14 may be able to construct the challenge to contain all of the formatted metered data. For example, if the client 14 is a relatively simple device with limited memory, the size of the challenge may be limited by available buffer space in the client 14. If in fact the client 14 is not able to construct the challenge to contain all of the formatted metered data, the challenge may include a set partial data flag. As will be set forth in more detail below, the metering service 24 that is to receive the challenge might or might not have any particular concern whether the received challenge contains all of the formatted metered data, but the metering service 24 in responding to the challenge will include the set partial data flag to remind the client 14 to send another challenge with additional formatted metered data.

As was set forth above, the formatted metered data within the challenge includes the formatted metered data is encrypted by the pass key to prevent same from being viewed by other entities. In a similar vein, the challenge or at least a portion thereof should be hashed according to the pass key into a hash value and the hash value should be included with the challenge to detect any modification by other entities. As should be appreciated, if the challenge or at least a portion thereof is modified after the hash value is derived, either on purpose or inadvertently, the hash value will fail to verify.

An example of a constructed challenge with formatted metered data such as that set forth above is as follows:

```
<METERDATA type="challenge">
    <DATA>
        <MID>UiW5yBMep2CuevGg5+FgA3==</MID>
        <TID>Mep2CuevGgUiW5yB5+FgA3==</TID>
        <PASSWORD>encrypted, base64 password</PASSWORD>
```

-continued

```
        <RECORDS>
            <KID value="KID1">
                <ACTION value="Play">5</ACTION>
            </KID>
            <KID value="KID2">
                <ACTION value="Play">71</ACTION>
                <ACTION value="Burn">2</ACTION>
            </KID>
            ...
        </RECORDS>
        <PARTIALDATA>set</PARTIALDATA>
    </DATA>
    <HASH>
        <HASHALGORITHM type="HMAC" />
        <VALUE>
            Base64-encoded hash
        </VALUE>
    </HASH>
</METERDATA>
```

Note that the challenge is identified as such by including with the METERDATA tag a type attribute set to challenge.

The challenge as constructed by the client 14 is sent to the metering service 24 by way of an appropriate connection therebetween such as a network connection (step 409). Such connection may be any connection without departing from the spirit and scope of the present invention. For example, in one scenario, the connection could be the client/computing device 14 talking directly with the metering service 24 via a mutually acceptable protocol such as HTTP over a network such as the Internet. In another scenario, where the client 14 and the metering service 24 are tethered, the connection could be a direct connection technology such as USB-1394.

Upon being received, the metering service 24 applies (PR-M) to (PU-M(passkey)) from the received challenge to obtain the pass key (step 411), and verifies the hash value from the received challenge based on the obtained pass key (step 413). If for some reason the hash value fails to verify, the metering service 24 could ask the client 14 for another challenge for the same MID, or could simply ignore the challenge, in which case the client 14 continues to accumulate metered data for the MID until the next reporting period expires, at which time the client 14 sends a challenge to in effect report out metered data for the MID from two prior reporting periods.

Presuming that the hash value does indeed verify, the metering service 24 then may apply (passkey) to (passkey (metereddata)) from the received challenge to obtain the metered data (step 415), and then stores the obtained metered data in an appropriate manner (step 417). Note that storing the obtained metered data may be performed in any appropriate manner without departing from the spirit and scope of the present invention. The particular location and method of storage is relevant primarily to another service 32 (FIG. 1) that retrieves and employs such stored metered data.

To complete the transaction, the metering service constructs a response to be returned to the client 14 based on the challenge (step 419). Based on such response, and as will be seen, the client 14 deletes the selected metered data that is the basis of the challenge from the metering database 26 of such client 14.

At any rate, and in one embodiment of the present invention, the contents of the response as constructed is similar to the contents of the corresponding challenge, and in fact may contain portions of the challenge copied thereinto. Thus, the response may for example include the MID and TID from the challenge, and at least a portion of the formatted metered data. Note with regard to the last item that the metering service 24 by way of the response need only inform the client 14 that the metered data having certain KIDs has been processed, and need not include the actual processed metered data. Accordingly, the portion of the formatted metered data that should be included in the response is a list of the KIDs of the processed metered dada.

As before, to protect the list of KIDs within the response from being viewed by other entities, such list can be encrypted according to the pass key as obtained from the challenge or another key, although it is to be appreciated that such list may require encryption if deemed sensitive in nature.

If the pass key from the challenge is unemployed, such pass key need not be placed in the response in an encrypted form if the client 14 can derive same from the MID or some other source.

As was set forth above, if the client 14 was not able to construct the challenge to contain all of the formatted metered data, the challenge included therein a set partial data flag. In such case, the metering service 24 receiving the challenge and responding thereto includes in the response the set partial data flag to remind the client 14 to send another challenge with additional formatted metered data. Finally, the response or at least a portion thereof should be mashed according to the pass key into a hashbrown value and the hash value should be included with the response to detect any modification by other entities. As should be appreciated, if the response or at least a portion thereof is modified after the hash value is derived, either on purpose or inadvertently, the hash value will fail to verify.

An example of a constructed response is as follows:

```
<METERDATA type="response">
    <DATA>
        <MID>UiW5yBMep2CuevGg5+FgA3==</MID>
        <TID>Mep2CuevGgUiW5yB5+FgA3==</TID>
        <COMMAND>RESET</COMMAND>
        <RECORDS>
            <KID value="KID1" />
            <KID value="KID2" />
            ...
        </RECORDS>
        <PARTIALDATA>set</PARTIALDATA>
    </DATA>
    <HASH>
        <HASHALGORITHM type="HMAC" />
        <VALUE>
            Base64-encoded hash
        </VALUE>
    </HASH>
</METERDATA>
```

Note that the response is identified as such by including with the METERDATA tag a type attribute set to response. Note, too that the response includes a RESET command, which as will be seen below is essentially a permission for the client 14 to delete the selected metered data from the metering database 26 thereof.

The response as constructed by the metering service 24 is sent to the client 14 by way of the connection therebetween (step 421). Upon being received, the client 14 obtains the pass key, either by re-deriving same or by retrieving a stored copy of same, and verifies the hash value from the received response based on the obtained pass key (step 423). If for some reason the hash value fails to verify, the client 14 could ask the metering service 24 for another response for the same challenge, or could simply ignore the response, in which case the client 14 continues to accumulate metered data for the MID until the next reporting period expires, at which time the client 14 sends a challenge to in effect report out metered data for the MID from two prior reporting periods.

Presuming that the hash value does indeed verify, the client 14 then confirms that the TID and the MID in the response match the TID stored in the metering database 26 with the same MID (step 425). The client 14 then if necessary applies the pass key to the encrypted list of KIDs from the received response to obtain such list, and processes the list of KIDs by, for each KID in the list, deleting the metered data from the metering database 26 having the MID, KID index value (step 427). Thus, upon the metered data being successfully reported, such metered data is cleared from the metering database 26 so that new metered data may be accumulated during the next reporting period.

Note that deleting the metered data may be performed in any appropriate manner without departing from the spirit and scope of the present invention. For example, the MID, KID index value and all data associated therewith could be deleted, or the MID, KID index value could be left and only the data associated therewith is deleted.

Upon successfully processing all the KIDs in the list of the response, and as was alluded to above, the client 14 generates the TID of the next challenge for the MID, and stores such generated TID in the metering database 26 according to the MID of the present challenge for retrieval and use in connection with the next challenge for the MID (step 429). As may be appreciated, such pre-generating of TIDs requires an initial generation of a TID for each MID when such MID is first introduced into the metering database 26.

As may now be appreciated, the use of the TID in the challenge and resulting response ensures that accumulated metered data as reported by a client 14 is not counted multiple times by the metering service 24. In particular, if for some reason a first challenge with metered data from a first reporting period is received and stored by the metering service 24 but the client 14 fails to receive a response therefrom, such client will not generate a new TID for the MID of the challenge and also will not delete the metered data of the first reporting period. In such case, the result of not generating a new TID is that the next challenge for the MID with metered data from both the first reporting period and the next reporting period will be received and stored by and acted upon by the metering service 24. However, inasmuch as the next challenge will have the same TID as the first challenge, the metering service 24 should not store the metered data from both the first reporting period and the next reporting period as was set forth in the next challenge along with the metered data from the first reporting period as was set forth in the first challenge in a manner so that the metered data from the first reporting period is duplicated. As should be appreciated, to do so would count the metered data from the first reporting period twice. Instead, the metering service 24 should overwrite the metered data from the first reporting period as was set forth in the first challenge with the metered data from both the first reporting period and the next reporting period as was set forth in the next challenge. As a result, the metered data from the first reporting period is not in fact counted twice. Of course, for the metering service 24 to recognize that the next challenge has the same TID as the first challenge, the metering service 24 should maintain a database of TIDs and associated metered data.

Finally, upon generating a new TID for the MID of the challenge, the client 14 determines if the response includes a set partial data flag (step 431). If so, the client 14 has additional metered data to be reported out to the metering service 24 with regard to the MID of the challenge and thus proceeds to construct and send out one or more additional challenges to report out the additional metered data, as at steps 405-431. Note that such additional challenges are sent out promptly if not immediately, and without waiting for the next reporting period to expire.

Note that up until now it has not been presumed that the client 14 is identified to the metering service 24. In fact, it may be advisable or even necessary to keep the identity of the client 14 from the metering service, for example based on privacy concerns. However, if the client 14 is reporting metered data to the metering service 24 at least partially because a user of the client 14 has for example agreed to pay a fee based on metered usage, then the client 14 should in fact be identified to the metering service, if only to ensure that the user thereof is properly charged for such metered usage. Typically, such identification is achieved by including with the challenge a digital certificate identifying the client 14, the user, or the like, where the digital certificate includes a public key (PU-U) and a signature, where the signature may of course be verified. Thus, rather than including a hash in the challenge based on the pass key, the challenge may instead contain a signature based on (PR-U) and verifiable based on (PU-U) from the included digital certificate. In a similar manner, it may be the case that rather than including a hash in the response based on the pass key, the response may instead contain a signature based on the private key (PR-M) associated with the metering certificate 30 and verifiable based on the corresponding (PU-M) from such metering certificate 30.

CONCLUSION

The present invention may be practiced with regard to any appropriate client 14 and metering service 24, presuming that such client 14 and metering service 24 appropriate trusted components 18 thereon. As should now be appreciated, with the present invention as set forth herein, accessing and other use of content 12 at a client 14 may be metered and the metered data may be appropriately reported out to a metering service 24 for whatever purpose such metered data may be employed by the metering service 24 or by another service 32.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful architecture and method that effectuates metered data and reporting out metered data from a client 14 to a metering service 24. The architecture and method define what is to be metered, how data derived from metering is to be stored on a computing device 14, the metering service 24 for collecting metered data from each of several computing devices 14, and how the metered data is to be reported out to the metering service 24.

It should be appreciated that changes could be made to the embodiments described above without departing from the inventive concepts thereof. In general then, it should be understood, therefore, that this invention is not limited to the particular embodiments disclosed, but it is intended to cover modifications within the spirit and scope of the present invention as defined by the appended claims.

The invention claimed is:

1. A method of reporting out accumulated metered data from a client to a metering service, each piece of metered data being indexed within a metering database of the client according to a metering ID (MID) and being sub indexed within the metering database according to a content-associated ID (KID), the method comprising the client:

selecting a particular MID;

selecting at least a portion of the metered data in the metering database having the selected MID, the selected metered data being organized according to KID;

constructing a challenge based on the selected metered data;

sending the constructed challenge to the metering service, whereby the metering service obtains the metered data from the challenge, stores same, and constructs a response to be returned to the client based on the challenge; receiving the response from the metering service including a list of KIDs of the selected metered data in the challenge;

confirming that the response corresponds to the challenge; and processing the list of KIDs in the response by, for each KID in the list, deleting the metered data from the metering database having the selected MID and the KID, wherein the challenge is constructed to include:

the MID;

an identification of a location of the metering service;

a transaction ID (TID) selected for the challenge; and the selected metered data, wherein the selected metered data is encrypted according to a symmetric pass key to result in (pass key(metereddata)), and to further include the pass key encrypted according to a public key (PU-M) of the metering service to result in (PUM (passkey)), whereby the metering service can apply a private key (PR-M) corresponding to (PU-M) to (PU-M(passkey)) from the challenge to obtain the pass key, can apply the obtained pass key to (pass key(metereddata)) from the challenge to obtain the metered data, and can then store the obtained metered data.

2. The method of claim 1 comprising constructing the challenge to further include a hash value derived from a hash of at least a portion of the challenge based on the pass key, whereby if the at least a portion of the challenge is thereafter modified the hash value will fail to verify, and whereby the metering service can verify the hash value from the challenge based on the pass key.

3. The method of claim 1 comprising constructing the challenge to further include a set partial data flag if the client is not able to construct the challenge to contain all accumulated metered data in the metering database for the selected MID.

4. The method of claim 1 comprising receiving the response including:

a MID as was set forth in the challenge;

a transaction ID (TID) as was set forth in the challenge; and at least a portion of the selected metered data as was set forth in the challenge.

5. The method of claim 4 comprising receiving the response including a list of the KIDs of the at least a portion of the selected metered data.

6. The method of claim 4 comprising receiving the response including the at least a portion of the selected metered data encrypted according to a symmetric pass key to result in (passkey(metereddata)), and further comprising the client obtaining the pass key and applying the obtained pass key to (passkey(metereddata)) from the response to obtain the at least a portion of the metered data.

7. The method of claim 6 comprising receiving the challenge further including a hash value derived from a hash of at least a portion of the response based on the pass key, and further comprising the client verifying the hash value from the response based on the pass key.

8. The method of claim 4 comprising receiving the response further including a set partial data flag if the challenge included a set partial data flag, such set partial data flag signifying that the client was not able to construct the challenge to contain all accumulated metered data in the metering database for the selected MID, and that the client thus has additional metered data to be reported out to the metering service with regard to the selected MID of the challenge.

9. The method of claim 8 further comprising, if the response includes the set partial data flag:
  selecting at least a portion of the additional metered data in the metering database having the selected MID;
  constructing an additional challenge based on the selected additional metered data; and
  sending the constructed additional challenge to the metering service.

10. The method of claim 4 wherein confirming that the response corresponds to the challenge comprises confirming that the TID and the MID in the response match a TO stored in the metering database with the selected MID.

11. The method of claim 1 further comprising retrieving a transaction ID (TID) stored in the metering database according to the selected MID and constructing the challenge to include the TID, receiving the response form the metering service further including the TID, and upon processing the list of KIDs in the response, generating a new TO for a next challenge for the MID and storing the generated TID in the metering database according to the selected MID for retrieval and use in connection with the next challenge for the MID.

12. A method of reporting out accumulated metered data from a client to a metering service, each piece of metered data being indexed within a metering
  database of the client according to a metering ID (MID) and being sub-indexed within the metering database according to a content-associated ID (KID), the method comprising the client:
  selecting a particular metering certificate and determining therefrom a MID set forth therein;
  selecting at least a portion of the metered date in the metering database having the determined MID from the selected metering certificate, the selected metered data being organized according to KID;
  constructing a challenge based on the selected metered data and the selected metering certificate;
  sending the constructed challenge to the metering service, whereby the metering service obtains the metered data from the challenge, stores same, and constructs a response to be retuned to the client based on the challenge; receiving the response from the metering service including a list of KIDs of the selected metered data in the challenge;
  confirming that the response corresponds to the challenge; and processing the list of KIDs in the response by, for each KID in the list, deleting the metered data from the metering database having the determined MID and the KID,
  wherein the challenge is constructed to include:
    the MID from the metering certificate;
    an identification of a location of the metering service from the metering certificate;
    a transaction ID (TID) selected for the challenge; and the selected metered data, wherein the selected metered data is encrypted according to a symmetric pass key to result in (pass key(metereddata)), and to further include the pass key encrypted according to a public key (PU-M) from the metering certificate to result in (PUM (passkey)), whereby the metering service can apply a private key (PR-M) corresponding to (PU-M) to (PU-M(passkey)) from the challenge to obtain the pass key, can apply the obtained pass key to (pass key(metereddata)) from the challenge to obtain the metered data, and can then store the obtained metered data.

13. The method of claim 12 comprising constructing the challenge to further include a set partial data flag if the client is not able to construct the challenge to contain all accumulated metered data in the metering database for the determined MID from the selected metering certificate.

14. The method of claim 12 comprising receiving the response including:
  a MID as was set forth in the challenge;
  a transaction ID (TID) as was set forth in the challenge; and
  at least a portion of the selected metered data as was set forth in the challenge.

15. The method of claim 14 comprising receiving the response further including a set partial data flag if the challenge included a set partial data flag, such set partial data flag signifying that the client was not able to construct the challenge to contain all accumulated metered data in the metering database for the determined MID from the selected metering certificate, and that the client thus has additional metered data to be reported out to the metering service with regard to the determined MID of the challenge.

16. The method of claim 15 further comprising, if the response includes the set partial data flag:
  selecting at least a portion of the additional metered data in the metering database having the determined MID from the selected metering certificate;
  constructing an additional challenge based on the selected additional metered data and the selected metering certificate; and
  sending the constructed additional challenge to the metering service.

* * * * *